(12) United States Patent
Lambert et al.

(10) Patent No.: US 7,210,622 B2
(45) Date of Patent: May 1, 2007

(54) ENHANCED PIN AND PASSWORD PROTECTION SYSTEM AND METHOD

(76) Inventors: Bruno Lambert, 99 Des Pistoles, Blainville, QC (CA) J7C 5C2; Éric Bourbonnais, 1050 Goulet apt. 411, St-Laurent, QC (CA) H4R 2E1

( * ) Notice: Subject to any disclaimer, the term of this patent is extended or adjusted under 35 U.S.C. 154(b) by 169 days.

(21) Appl. No.: 11/021,793

(22) Filed: Dec. 23, 2004

(65) Prior Publication Data

US 2005/0139658 A1 Jun. 30, 2005

Related U.S. Application Data

(60) Provisional application No. 60/532,521, filed on Dec. 29, 2003.

(51) Int. Cl.
*G06K 7/01* (2006.01)
(52) U.S. Cl. .................. 235/382.5; 235/379; 235/380; 340/5.51; 713/184
(58) Field of Classification Search ............ 235/382.5, 235/385.5; 340/5.51, 5.53, 5.54, 5.6; 713/184, 713/185
See application file for complete search history.

(56) References Cited

U.S. PATENT DOCUMENTS

| 3,996,450 | A |  | 12/1976 | Kerkhoff |
| 4,837,422 | A |  | 6/1989 | Dethloff et al. |
| 5,177,789 | A | * | 1/1993 | Covert ..................... 713/184 |
| 5,239,583 | A |  | 8/1993 | Parillo |
| 5,251,259 | A |  | 10/1993 | Mosley |
| 5,428,349 | A |  | 6/1995 | Baker |
| 5,478,994 | A |  | 12/1995 | Rahman |
| 5,724,423 | A |  | 3/1998 | Khello |
| 5,754,652 | A |  | 5/1998 | Wilfong |
| 6,246,769 | B1 |  | 6/2001 | Kohut |
| 6,425,523 | B1 |  | 7/2002 | Shem-Ur et al. |
| 7,036,016 | B1 | * | 4/2006 | Smith, Jr. ................... 713/185 |

FOREIGN PATENT DOCUMENTS

CA 2358753 10/2001

* cited by examiner

*Primary Examiner*—Seung Ho Lee

(57) ABSTRACT

An enhanced PIN, password, passcode protection system and method using an input terminal interface displaying a sequence of random symbols and a set of software rules set in a lookup table also prepared by software means, and the software means is stored in hardware means and at least one of a plurality of transformations are selected by a user and are based on preselected rules arranged in the lookup table and preprogrammed into the software. A currently used PIN has one or more symbols transformed according to the preselected rules and the user's PIN, transformed into a modified PIN, is input into the input terminal interface.

5 Claims, 1 Drawing Sheet

|   | *Direction* | *K* | *Result* |
|---|---|---|---|
| a | south |  | *2 becomes 4* |
| b | north |  | *6 becomes 5* |
| c | north west |  | *9 becomes 4* |
| d | north east |  | *1 becomes 0* |
| e | south east |  | *0 becomes 4* |
| f | south west |  | *1 becomes 8* |
| g | east series 1 |  | *6 becomes 8* |
| h | east series 2 |  | *7 becomes 3* |
| i | west series 1 |  | *5 becomes 1* |
| j | west series 2 |  | *0 becomes 8* |
| k | south + constant | 3 | *1 becomes 3* |
| l | south - constant | 2 | *6 becomes 5* |
| m | PIN digit + number south |  | *2 becomes 6* |

FIG. 1

| | Direction | K | Result |
|---|---|---|---|
| a | south | | 2 becomes 4 |
| b | north | | 6 becomes 5 |
| c | north west | | 9 becomes 4 |
| d | north east | | 1 becomes 0 |
| e | south east | | 0 becomes 4 |
| f | south west | | 1 becomes 8 |
| g | east series 1 | | 6 becomes 8 |
| h | east series 2 | | 7 becomes 3 |
| i | west series 1 | | 5 becomes 1 |
| j | west series 2 | | 0 becomes 8 |
| k | south + constant | 3 | 1 becomes 3 |
| l | south - constant | 2 | 6 becomes 5 |
| m | PIN digit + number south | | 2 becomes 6 |

FIG. 2 series 1 :  7 9 1 5 4 0 2 6 8 3
series 2 :  5 8 0 6 1 9 4 7 3 2

FIG. 3 series 1 :  5 8 0 3 6 9 4 2 7 1
series 2 :  7 9 3 0 2 1 5 6 8 4

FIG. 4 series 1 :  A 3 * 4 F j " R L /
series 2 :  Q 3 W 5 E 6 y ? i * K(

FIG. 5 series 1 :  RED BLUE ORANGE YELLOW
series 2 :  GREEN VIOLET INDIGO CYAN

ENHANCED PIN AND PASSWORD PROTECTION SYSTEM AND METHOD

This application claims priority based on provisional application 60/532,521 filed Dec. 29, 2003.

BACKGROUND OF THE INVENTION

1. Field of the Invention

The invention relates generally to electronic security but more particularly to a method for protecting the PIN or password of a user.

2. Background of the Invention

With the constant threat of hackers, piracy, identity theft and so on, one can never be too careful when it comes to doing electronic transactions. One device that is often the target of thieves is the bank's ATM machine. Over the years, a number of strategies have been used to try to steal money from those machines or to gain access to accounts which makes it possible to withdraw cash. Although ATM machines often make the news, other types of devices using card access could be targeted by thieves such as card access doorways, various types of electronic machines, even Internet access from home which may, in years to come, offer the possibility of "reloading" debit cards or prepaid cards from a home terminal.

For this reason, a number of counter strategies have been developed in recent years to foil attempts by thieves and resolve this issue, not just for ATMs but every device requiring a PIN or password for access. To simplify the description, from now on, the use of the expression <<PIN>> will also include password.

U.S. Pat. No. 4,837,422 discloses a card combination which is issued to a single cardholder and which can be reprogrammed by the cardholder for use by a sub-user to a desired extent with regard to value and time. The cardholder uses a master enabling code to access the programming mechanism. He/she assigns a sub-PIN for use by the sub-user and opens a subordinate account for the allowed credit value within card's total credit value. This subordinate account can be accessed using the sub-PIN. A limited term can be selected during which any transaction using the sub-PIN and using the subordinate account can be conducted. After the expiration of that term the sub-PIN is automatically erased and any balance in the suborinate account is re-credited to the main credit account of the card. Such a multi-user card can also be used in conjunction with a program for varying the value of units stored in the credit account.

U.S. Pat. No. 5,239,583 discloses an improvement in structure and credit account access security employing method and means for ensuring that repeating an exact access code which was successful in accessing the account will be unsuccessful at the next or subsequent tries. The user enters a PIN code in accordance with a prescribed, but variable, sequence, the sequence being different for each transaction from the previous transaction. The user inputs the PIN by entering a sequence of alphanumeric symbols in accordance with a prescribed "start" sequence of symbols for recognition as a proper 4-digit PIN for a first transaction. The user must enter a new PIN to access the same account on subsequent tries. Preferably, the sequence of symbols comprising the PIN has only one symbol different from the "start" sequence for recognition as a proper PIN for a second transaction and the third transaction may require yet a third sequence of alphanumeric symbols comprising a third PIN. As many different PINs as desired can be accommodated within reasonable limits.

U.S. Pat. No. 5,251,259 discloses a group of seven PINs assigned to each card holder. The group of PINs are to be used in a specific sequence changing each calendar day. If a PIN is used out of sequence, then access to the charge or credit card is denied by the card company. A grid of numbers and letters are used to vary the PIN each day. The grid includes seven rows and seven columns with the numbers 1 through 7 randomly selected and placed in the seven rows and columns. The rows and columns, when utilized correctly, allow the card holder to access seven three-digit codes. The codes or personal identification numbers must be used in the correct sequence which is determined by the number of uses per calendar day.

U.S. Pat. No. 5,428,349 discloses a password access method/algorithm effected by generating a pseudorandom array of each letter of the alphabet and the numerals 0 through 9 such that the password entry can be monitored without disclosing the letters or numerals contained in the password. The preferred arrangement is a square matrix of six rows and six columns of characters. The user enters the password by selecting either the row or column containing each letter of a memorized password.

U.S. Pat. No. 5,478,994 discloses a secure credit card 10 having a body member to which is attached a microprocessor controller electrically coupled a Programmable Read Only Memory (PROM) device programmed with a series of random numbers in a predetermined sequence. The random numbers are identical to random numbers in a host computer and in the identical sequence as the random numbers in the host computer. This computer is accessible upon each use of the credit card. The Programmable Read Only Memory (PROM) accesses the next random number in sequence with each use of the credit card to permit verification by comparing the random number with each use of the credit card with the next random number in sequence as indicated by the computer. A switch actuated with each use of the credit card provides a pulse signal that activates the microprocessor controller to turn on the Programmable Read Only Memory (PROM) to access the next random number in the sequence. A counter connected to the microprocessor controller counts the number of pulse signals received to count each use of the credit card. A display device displays the next Personal Identification Number (PIN) in the sequence each time a pulse is received.

U.S. Pat. No. 5,724,423 discloses a user authentication service which is both highly secure and user friendly. To access a particular service, a user simply enters a PIN using a portable terminal device which encodes the PIN. More specifically, a character position of the user's PIN is determined, and a random code having a length selectable at each service transaction by the user is generated. The user's PIN is encrypted using one of plural available, pseudo-randomly encrypting algorithms to provide an encrypted PIN. The encrypted PIN is then combined with the code at the determined position before being transmitted over a communications network. When received, the encoded PIN is decoded using an analogous procedure to determine if the user is authorized. A plurality of security levels are provided with each level having a plurality of encryption algorithms and with each increasing level providing encryption algorithms of increasing complexity and sophistication. A user may also change a current PIN from the portable device easily and securely without having to contact a service center.

U.S. Pat. No. 5,754,652 discloses a method for sequentially encrypting the digits of a personal identification number, and an apparatus for practicing the method. According to the method, a random number is generated and supplied to a user requesting access to a system. The user encrypts a digit of his personal identification number by performing a function on the random number and the digit and then provides the encrypted digit to a verification system. A second random number is then generated, provided to the user, applied to encrypt another digit of the user's personal identification number and then input to the verification system. The dialogue between verification system and the user continues, digit by digit, until each digit of the personal identification number has been provided to the verification system in encrypted form. The verification system then compares the encrypted input with the user's personal identification number accessed from memory.

U.S. Pat. No. 6,246,769 discloses a system that eliminates the use and recall of multiple dedicated access codes to verify an authorized user across multiple protected resources. Fixed access codes selected by a user, or issued to a user, such as PINs, passwords and passcodes are replaced by temporary codes that are valid only for the specific transaction in progress. A temporary code is randomly selected by the system and displayed to the user encoded within a completely filled geometric matrix along with other non-code characters. The user must recall a single, predetermined sequential pattern within said matrix in order to obtain the access code. Once the code is obtained, or decoded from the matrix, the user must enter that code into the system. If the entered code matches the transaction specific code in system memory, access to the protected resource is granted and the transaction is allowed to proceed.

U.S. Pat. No. 6,425,523 discloses a method for preventing unauthorized use of credit cards in remote payments and a supplemental-code card for therein. A unique code list is provided by the credit company to the credit card owner for use with the credit card. The codes are distributed in a variety of possible ways, including through ATMs, stores, e-mail or faxes. A copy of each code list is associated at the credit card company with the owner of the credit card. Each code is only for a single use. For every remote payment, the credit card owner transmits one of the codes to the creditor, along with conventional credit card data. The credit card company verifies the transmitted information and accepts or rejects the transaction. The codes may be provided on a supplemental-code card with some mechanism to ensure that each code is used only once.

Canadian patent 2,358,753 discloses a PIN assignation methods which gives a new PIN at the end of each transaction or else, gives out a new modifier which instructs the user on how to modify his PIN on the next transaction. A modifier proposed is a "BME" transformation wherein a user will add a digit at the beginning (B), the end (E) or anywhere in the middle (M) of his regular PIN.

The more basic of such strategies involve a one time use PIN number that a user will select from a card given to him listing all PIN numbers. The obvious disadvantage of this method is that losing or having this card stolen renders the method useless. Another variant is that of a PIN for each day of the week which allows a user to change his PIN according to a listing of digits for each day of the week which are used to modify by simple arithmetics, the PIN number known to the user only.

SUMMARY OF THE INVENTION

To simplify the description, from now on, the use of the expression "PIN" will also include password and passcode. As can be seen from the prior art, the issue of personal information privacy is the subject of many inventions that are using very simple strategies like selecting a PIN from a card given to a user listing all PIN numbers. The obvious disadvantage of this method is that losing or having this card stolen renders the method useless. Other methods of obfuscating a PIN number have the disadvantage of requiring very complex software and hardware or require the user to remember complex procedures. In view of the foregoing disadvantages inherent in the known devices now present in the prior art, the present invention, which will be described subsequently in greater detail, is to provide objects and advantages which are to provide a simple and efficient means of transforming a PIN so as to render it unusable to a user attempting to steal it.

To attain this end, this invention uses variations of a digit swapping strategy which changes numbers according to predetermined rules. That way, if a thief eavesdrops on a PIN being entered by a user, the actual sequence being input is not the actual PIN number but rather a modified PIN as per a sequence of randomly selected symbols which change at each transaction and a set of rules known to the user. This PIN protection system can be applied to many different devices from ATMs to merchants credit/debit card processing terminals to home computing appliances, PDAs and any existing or yet to be created interface where a PIN is being used.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE PREFERRED EMBODIMENT

FIG. 1 Table of possible transformations.

FIG. 2 A first example of randomly generated numbers.

FIG. 3 A second example of randomly generated numbers.

FIG. 4 A third example using letters, numbers, and symbols

FIG. 5 A fourth example using colors.

DETAILED DESCRIPTION OF THE PREFERRED EMBODIMENT

An enhanced PIN protection method (10) uses an input terminal interface (not shown) displaying a sequence of random symbols (12) and a set of software rules set in a lookup table (14), also prepared by software means (not shown), the software means is stored in hardware means (not shown) as current technology allows, future technology may use more efficient means. At least one of a plurality of transformations are selected by a user. The transformations are based on preselected rules arranged in the lookup table (14) and which are preprogrammed into the software. In this manner, a currently used PIN has one or more symbols transformed at the moment of input by a user according to the preselected rules and the randomly generated symbols by the software and displayed on the input terminal interface. Alphanumeric or other abstract symbols displayed on the input terminal interface can also be generated by the software. By applying the preselected transformation, the user's PIN is transformed into a modified PIN which is input into the input terminal interface.

EXAMPLE 1

A user does business with a bank, the bank presents its clients a lookup table (14) which shows transformation rules which correspond to how the software will process the modified PIN. The user selects one or more transformation rules and informs the bank that he will use transformation "c". This having been arranged at the bank in a manner similar to how PIN are registered nowadays, that is as a one time process upon opening an account or other rare occasions when one wants to change preferences, the client is now set to use any ATM to do transactions. The ATM screen displays a sequence of randomly generated digits as per FIG. 2. If the user's PIN number is:

9 7 5 3 according to transformation "c" as applied to the series of randomly generated symbols (12) of FIG. 2, his PIN will now be:

4 2 3 6

Since transformation "c" (13) requires that the user moves up and one left (north west), in the case of 5 which is at the left on series 2, the number 3 at the right end of series 1 is picked. The user would input the sequence "4236" as his PIN Since the sequence of random symbols (12) change at each transaction, instead of changing a 9 for a 4 as was the case above, the next sequence of random symbols (12) as per FIG. 3 would change a 9 to a 5. In this manner, entering "4236" again would not work since even though the rules are the same, the corresponding symbols are different.

EXAMPLE 2

A user instructs his bank that he will apply rule "m" to his first PIN digit, no rule to the second digit, rule "k" to the third and rule "d" to the fourth, in which case the 9 would, according to FIG. 3, become 1 which is added to the original digit, 9, to give 10, in fact 0 as a result.

Rules "k" and "l" add or subtract a constant to the corresponding number. In this case, the third PIN digit, 5, following this rule as per FIG. 3 would become 7+ the constant which is 3 for a result of 0.

The display may not necessarily show the words "series 1, 2" but may show either cardinal markers or up, down, left, right to guide a user in inputting his PIN.

EXAMPLE 3

The rules apply to letters, digits and symbols as found on an input interface such as a computer keyboard and otherwise operates as in the previous examples.

EXAMPLE 4

The rules apply to colors wherein digits are replaced by colors (real colors, not the words as per FIG. 5). The color blue could be transformed to the color violet by a simple north to south conversion.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. An enhanced PIN protection using an input terminal interface displaying a sequence of random symbols and a set of software rules set in a lookup table also prepared by software means, and said software means being stored in hardware means having the following method of use:

at least one of a plurality of transformations are selected by a user said at least one of a plurality of transformations being based on preselected rules arranged in said lookup table and preprogrammed into said software;

a currently used PIN has one or more symbols transformed at the moment of input by a user according to said preselected rules and said sequence of random symbols displayed on said input terminal interface as generated by said software means;

said user inputting said modified PIN into said input terminal interface.

2. An enhanced PIN protection method as in claim 1 wherein:

sequence of random symbols displayed on said input terminal interface being numerical.

3. An enhanced PIN protection method as in claim 1 wherein:

sequence of random symbols displayed on said input terminal interface being alpha numerical.

4. An enhanced PIN protection method as in claim 1 wherein:

sequence of random symbols displayed on said input terminal interface being alphabetical.

5. An enhanced PIN protection method as in claim 1 wherein:

sequence of random symbols displayed on said input terminal interlace being colors.

* * * * *